(12) United States Patent
Singerle, Jr.

(10) Patent No.: US 8,224,887 B2
(45) Date of Patent: Jul. 17, 2012

(54) SYSTEM, METHOD AND COMPUTER PROGRAM PRODUCT FOR AUTHENTICATING A CLIENT

(75) Inventor: Gregory J. Singerle, Jr., Charlotte, NC (US)

(73) Assignee: Authenticatid, LLC, Charlotte, NC (US)

( * ) Notice: Subject to any disclaimer, the term of this patent is extended or adjusted under 35 U.S.C. 154(b) by 2176 days.

(21) Appl. No.: 10/808,166

(22) Filed: Mar. 24, 2004

(65) Prior Publication Data

US 2004/0193882 A1 Sep. 30, 2004

Related U.S. Application Data

(60) Provisional application No. 60/457,357, filed on Mar. 26, 2003.

(51) Int. Cl.
*G06F 15/16* (2006.01)
*H04L 9/32* (2006.01)
(52) U.S. Cl. ......................... 709/203; 713/168
(58) Field of Classification Search .................. 709/203
See application file for complete search history.

(56) References Cited

U.S. PATENT DOCUMENTS

| | | | |
|---|---|---|---|
| 5,251,259 A | 10/1993 | Mosley | |
| 5,428,349 A | 6/1995 | Baker | |
| 5,712,627 A | 1/1998 | Watts | |
| 6,130,621 A | 10/2000 | Weiss | |
| 6,215,872 B1 | 4/2001 | Van Oorschot | |
| 6,253,328 B1 | 6/2001 | Smith, Jr. | |
| 6,260,142 B1 | 7/2001 | Thakkar et al. | |
| 6,327,595 B1 | 12/2001 | Lyson et al. | |
| 6,339,423 B1 | 1/2002 | Sampson et al. | |
| 6,460,141 B1 | 10/2002 | Olden | |
| 6,567,914 B1 | 5/2003 | Just et al. | |
| 6,571,336 B1 | 5/2003 | Smith, Jr. | |
| 6,802,000 B1 * | 10/2004 | Greene et al. | 713/168 |
| 6,813,716 B1 | 11/2004 | Kaplan | |
| 2002/0013904 A1 * | 1/2002 | Gardner | 713/184 |
| 2002/0046335 A1 | 4/2002 | Baum-Waidner | |
| 2004/0193882 A1 | 9/2004 | Singerle, Jr. | |

FOREIGN PATENT DOCUMENTS

| | | |
|---|---|---|
| JP | 2002278929 | 9/2002 |
| WO | WO 92/07436 A1 | 4/1992 |
| WO | WO 01/06699 A2 | 1/2001 |
| WO | WO 01/77792 A2 | 10/2001 |
| WO | WO 02/08974 A2 | 1/2002 |

* cited by examiner

*Primary Examiner* — Ario Etienne
*Assistant Examiner* — Blake Rubin
(74) *Attorney, Agent, or Firm* — Smith Moore Leatherwood LLP

(57) ABSTRACT

A system, method and computer program product are provided for authenticating a user. The method includes receiving, such as from an authenticator, a set of at least one label identifying at least one element of an authentication matrix. The authentication matrix includes a plurality of elements, each element capable of being identified by a label. Then, a passcode is formulated, such as by the client, based upon the element(s) identified by the received set of label(s). Thereafter, the client is authenticated based upon the formulated passcode, such as by the authenticator. The set of label(s) can be received, the passcode can be formulated, and the client can be authenticated a plurality of times. In such instances, to permit the passcode to dynamically change, each set of label(s) received can differ from each previously received set of label(s).

97 Claims, 15 Drawing Sheets

Any Bank USA

Personal Information

First Name:      MI:      Last Name:      Date of Birth: (mm/dd/yyyy)

Address:      Apt. / Suite:      Social Security Number:

City:      State:      Zip Code:      Lived There:      Home Phone Number:

Employment Information

Employer Name:      Time at Employer: (yy/mm)      Work Phone Number:

Financial Information

Gross Annual Household Income:      Monthly House Payment:      Housing Status:

$ [ ] .00      [ ] .00      ○ Own    ○ Rent

☐ My credit history is clear of bankruptcy.

☐ My credit history is clear of seriously delinquent accounts.

☐ I have not been denied credit in the past six months.

[Submit]

FIG. 7.

Please authenticate:
E2 C2 C3

FIG. 8.

Enter Alphanumeric Pairs:

Submit

| A | B | C | D | E |
| 1 | 2 | 3 | 4 | 5 |

Run Again

FIG. 10.

Identity Authenticated:

Jonathan Quincy Public
123 Main Street
Charlotte, NC 28211

FIG. 11.

Enter Social Security Number:

Do not include dashes

111223333

☐ Paper Application

Submit

FIG. 12.

Any Bank USA

Personal Information

Last Name/First Name/MI/Suffix
| P | U | B | L | I | C | | J | O | N | A | T | H | A | N | | Q | | | | | | |

Address:
| 1 | 2 | 3 | | M | A | I | N | | S | T | R | E | E | T | | | | | | | | |

City: CHARLOTTE  State: NC  Zip Code: 28211

Lived There: (Years/Months) 04 / 07
Home Phone Number: 7045551234
Date of Birth: (MM/DD/YYYY) 12/16/1976
Social Security Number: 111223333

Employment Information

Employer Name: ABC CONSTRUCTION CO
Work Phone Number: 7045560987
Time at Employer: (Years/Months) 15 / 03

Financial Information

Gross Annual Household Income: $36000.00
Monthly Housing Payment: $600.00
Housing Status (check one): ☐ Rent  ☒ Own ☒ My credit history is clear of bankruptcy.
☒ My credit history is clear of seriously delinquent accounts.
☒ I have not been denied credit in the past six months.

Please Authenticate A3 E1 B2: 9905297

FIG. 13.

Enter passcode from application:

99052977

Enter alphanumeric pairs from application:

A3   E1   B2

Submit

FIG. 14.

Shopping Cart: Confirm Order

Ship to:

Jonathan Q. Public
123 Main St.
Charlotte, NC 28211

Payment Method:
    XXXX XXXX XXXX 9234

| | |
|---|---:|
| Purchase Subtotal | $563.94 |
| Shipping (2 day air) | $21.45 |
| Total | $585.39 |

Change shipping options     [ Confirm Purchase ]

FIG. 15.

Margin Account Application Form
(For customers who have an existing Cash Account at Brokerage)

Account Holder Name: Jonathan Q. Public

Joint Account Holder Name:

Account Number: 123456789

Type of Account:

☑ Individual Account ☐ Joint Account ☐ Corporate Account

Declaration - Individual/Joint/Corporate Account

I/we hereby declare that: (a) the information and representation contained in this Margin Account Application Form are true, complete, and correct; (b) I am/we are the person(s) who is/are ultimately responsible for originating the instructions; and (c) I am/we are the person(s) who stand(s) to gain the commercial/economic benefit of the transaction and/or bear the commercial/economic risk.

☑ I/we have read the Brokerage Customer Service Agreement for Securities Margin Financing ('Margin Agreement') on the Broker Web site and/or otherwise provided to me/us by Broker ;

☑ Broker has highlighted to me/us the risk disclosure statements set out in Clause 40 of the Margin Agreement; and ☑ Broker has invited me/us to read the said disclosure statements, to ask questions, and to take independent advice if I/we so wish.

| Click to Digitally Sign |

Individual/Primary Joint Account Holder's
Signature/Authorized Signatory

FIG. 16.

Margin Account Application Form (For customers who have an existing Cash Account at Brokerage)

Account Holder Name: Jonathan Q. Public

Joint Account Holder Name:

Account Number: 123456789

Type of Account:

☑ Individual Account  ☐ Joint Account  ☐ Corporate Account

Declaration - Individual/Joint/Corporate Account

I/we hereby declare that: (a) the information and representation contained in this Margin Account Application Form are true, complete, and correct; (b) I or originating the s) to gain the the ement for he Broker Web statements set out re statements, to o wish.

Digital Signature Authentication

Please Authenticate C4 E1 A4.

SUBMIT

FIG. 17.

Margin Account Application Form
(For customers who have an existing Cash Account at Brokerage)

Account Holder Name: Jonathan Q. Public

Joint Account Holder Name:

Account Number: 123456789

Type of Account:

☑ Individual Account ☐ Joint Account ☐ Corporate Account

Declaration - Individual/Joint/Corporate Account

I/we hereby declare that: (a) the information and representation contained in this Margin Account Application Form are true, complete, and correct; (b) I am/we are the person(s) who is/are ultimately responsible for originating the instructions; and (c) I am/we are the person(s) who stand(s) to gain the commercial/economic benefit of the transaction and/or bear the commercial/economic risk.

☑ I/we have read the Ameritrade Customer Service Agreement for Securities Margin Financing ("Margin Agreement") on the Broker Web site and/or otherwise provided to me/us by Broker ;

☑ Broker has highlighted to me/us the risk disclosure statements set out in Clause 40 of the Margin Agreement; and ☑ Broker has invited me/us to read the said disclosure statements, to ask questions, and to take independent advice if I/we so wish.

Jonathan Q. Public
*Digitally Signed*

SYSTEM, METHOD AND COMPUTER PROGRAM PRODUCT FOR AUTHENTICATING A CLIENT

CROSS-REFERENCE TO RELATED APPLICATIONS

The present application claims priority from U.S. Provisional Patent Application S/N 60/457,357, entitled: METHOD AND SYSTEM PROVIDING A MEANS OF IDENTIFICATION, filed on Mar. 26, 2003, the contents of which are incorporated herein by reference in its entirety.

FIELD OF THE INVENTION

The present invention generally relates to systems and methods for authenticating a client and, more particularly, to systems, methods and computer program products for authenticating a client via a dynamic passcode.

BACKGROUND OF THE INVENTION

Identity theft has been one of the fastest-growing crimes in the United States in recent years. Approximately every forty-five seconds an American falls victim to identity theft. In fact, the Federal Trade Commission (FTC) estimates that approximately ten million Americans were victims of identity theft in 2002. Reports of this crime were the chief consumer complaint made to the FTC in 2001 and 2002, accounting for forty-two percent of all complaints in 2002, up from twenty-three percent in 2001. The FTC estimates that 27.3 million Americans have been victims of identity theft over the past five years.

The FTC further estimates that fraud-related crimes cost the U.S. economy fifty-three billion dollars annually. Although consumers are not responsible for fraudulent charges related to identity theft, on average, a victim can be forced to incur between $1,000 and $2,000 in direct expenses, and devote approximately 200 hours of time fighting identity theft, over a period of several years. The intangible costs are much higher, including a ruined credit rating, inability to purchase large assets (e.g., home, car, etc.), denied employment, and emotional devastation.

The rampant spread of identity theft, such as that relating to credit application fraud, is primarily due to three reasons: (1) inadequate identification of applicants; (2) the lack of an economic incentive for various organizations to implement identity theft solutions; and (3) the widespread availability and ease of obtaining credit. In this regard, conventional techniques for identifying applicants, including by name, address, Social Security number (SSN), date of birth or the like, are typically inadequate to avoid identity theft because of the overuse and ease with which this information can be obtained. Stealing such personal information has become simple for identity thieves who can obtain personal information via illegal as well as legal means.

For example, identity thieves can obtain personal information by hacking or illegally accessing credit-reporting databases, employers' human resource files, medical records, insurance files or the like. Also, for example, identity thieves can obtain personal information from an applicant's wallet, mail, and/or garbage, or through telemarketing or employment scams. It has been shown that in many instances, a victim's personal information is stolen by a family member, coworker, housekeeper or other person personally known to the victim. In addition, for example, identity thieves can legally obtain personal information obtained for a nominal fee from agencies offering background check services.

Although identity thieves can obtain personal information in any of the aforementioned as well as other manners, one of the fastest-growing means of obtaining personal information is from illegally accessing company databases. In December 2002, for instance, forty thousand credit reports were stolen from Teledata. In January 2003, five hundred thousand medical records were stolen from TriWest Healthcare Alliance. And in March 2003, fifty-five thousand employee and student names and SSNs were stolen from the University of Texas. Such cases are merely representative of the large number of such identity theft instances, which experts expect to dramatically increase in coming years. Regrettably, however, these over half-million people, as well as the others whose personal information is similarly stolen, have no recourse other than to sit back and wait to see if they become victims of identity theft.

In addition to the inadequate identification of applicants, as indicated above, the lack of an economic incentive for various organizations to implement identity theft solutions also typically plays a role in the rampant spread of identity theft. In this regard, organizations such as the major credit bureaus (e.g., Equifax, Experian, TransUnion, etc.) derive revenue from selling information regarding consumers. As such, these organizations are typically reluctant to implement any measure that restricts such sales, even to make identity theft more difficult. Currently, then, the best means to combat identity theft as it relates to the credit bureaus includes subscribing to a credit-monitoring service that requires an individual to repeatedly purchase the consumer's credit report from one or more of the credit bureaus.

Further, from an economic standpoint, although the cost of identity theft to the U.S. economy and individual consumers far exceeds the cost of implementing identity theft solutions, the cost of implementing identity theft solutions for many organizations such as credit bureaus and credit issuers typically exceeds their cost of identity theft. In this regard, it should be noted that the cost of preventing identity theft can exceed the cost of losses due to fraud since conventional techniques for reducing identity theft can have a negative impact on the overall market of credit issuers. Conventional techniques enable issuers to screen out a number of the fraudulent applications, but to eliminate fraudulent applications, a significant number of otherwise proper applications, and thus good customers, are also typically screened out. Thus, when credit issuers act in their best economic interest, it is better to issue credit to all applicants and write off fraudulent applications as a cost of business.

SUMMARY OF THE INVENTION

In light of the foregoing background, embodiments of the present invention provide an improved system, method and computer program product of authenticating a client. The system, method and computer program product of embodiments of the present invention are capable of authenticating a client in a manner that reduces instances of identity theft without a negative economic impact to organizations implementing embodiments of the present invention. In this regard, the system, method and computer program product of embodiments of the present invention are capable of being implemented by organizations without requiring undue implementation costs or costs due to negative impacts on the overall market of such organizations.

As explained below, the improved system, method and computer program product of embodiments of the present invention reduce identity theft before it occurs by providing a way for a client or a user associated with the client to positively prove his/her identity. According to embodiments of the present invention, a client can be authenticated based upon a dynamic passcode. Unlike a static password or personal identification number (PIN), however, the passcode of embodiments of the present invention is dynamic and capable of changing each time the client employs the system or passcode.

According to one aspect of the present invention, a method is provided, such as for authenticating a client. The method includes receiving, such as from an authenticator, a set of at least one label identifying at least one element of a matrix, such as an authentication matrix. The matrix includes a plurality of elements, each element capable of being identified by a label. Then, a response, such as a passcode, is formulated based upon the element(s) identified by the received set of label(s). Thereafter, the client can be authenticated based upon the formulated passcode, such as by the authenticator. The set of label(s) can be received, the passcode can be formulated, and the client can be authenticated a plurality of times. In such instances, to permit the passcode to dynamically change, each set of label(s) received can differ from each previously received set of label(s).

The method can also include generating the passcode based upon at least one element selected from the authentication matrix. In such instances, the set of label(s) received can identify the selected element(s). Also, the client can be authenticated further based upon the generated passcode. More particularly, an authentication matrix can be provided to an authenticator, and an authentication matrix can be provided to the client. A passcode, in turn, can be generated based upon element(s) selected from the authentication matrix provided to the authenticator. Similarly, a passcode can be formulated based upon element(s) of the authentication matrix provided to the client corresponding to the element(s) selected from the authentication matrix provided to the authenticator.

To provide added security in authenticating the client, a passcode can be generated further based upon a personal identification number (PIN) associated with the client. In such instances, the passcode can be formulated further based upon the PIN. More particularly, a passcode can be generated to include element(s) selected from the authentication matrix and the PIN in a predefined position with respect to the selected element(s). Likewise, a passcode can be formulated to include the identified element(s) and the PIN in the predefined position with respect to the identified element(s). As such, the client can be authenticated by identifying a match between the generated passcode and the formulated passcode.

In one typical embodiment, a plurality of authentication matrices are provided to the authenticator, each authentication matrix associated with a different client. The client being authenticated, then, can be provided with an authentication matrix associated with the respective client. Thus, a passcode can be generated based upon element(s) selected from the authentication matrix provided to the authenticator and associated with the respective client. In such instances, at least one piece of identifying information associated with the client being authenticated can be received, such as by the authenticator. Thereafter, the authentication matrix associated with the client being authenticated can be identified from the plurality of authentication matrices provided to the authenticator based upon the piece(s) of identifying information. A passcode can thereafter be generated based upon element(s) selected from the identified authentication matrix.

According to other aspects of the present invention, a system and computer program product are provided for authenticating a user. Therefore, embodiments of the present invention provide a system, method and computer program product for authenticating a user. By generating a passcode based upon element(s) selected from an authentication matrix, and providing the label(s) identifying such element(s) in a manner such that the label(s) and thus the selected element(s) differ from one instance of authenticating the client to the next, the system, method and computer program product of embodiments of the present invention provide a dynamically changing passcode for authenticating the client. In this regard, unlike a static password or personal identification number (PIN), the passcode of embodiments of the present invention is dynamic and capable of changing each time the client employs the passcode to be authenticated. The system, method and computer program product of embodiments of the present invention are therefore capable of authenticating a client in a manner that reduces instances of identity theft without a negative economic impact to organizations implementing embodiments of the present invention. Thus, the system, method and computer program product of embodiments of the present invention solve the problems identified by prior techniques and provide additional advantages.

BRIEF DESCRIPTION OF THE DRAWINGS

Figures 1, 2:
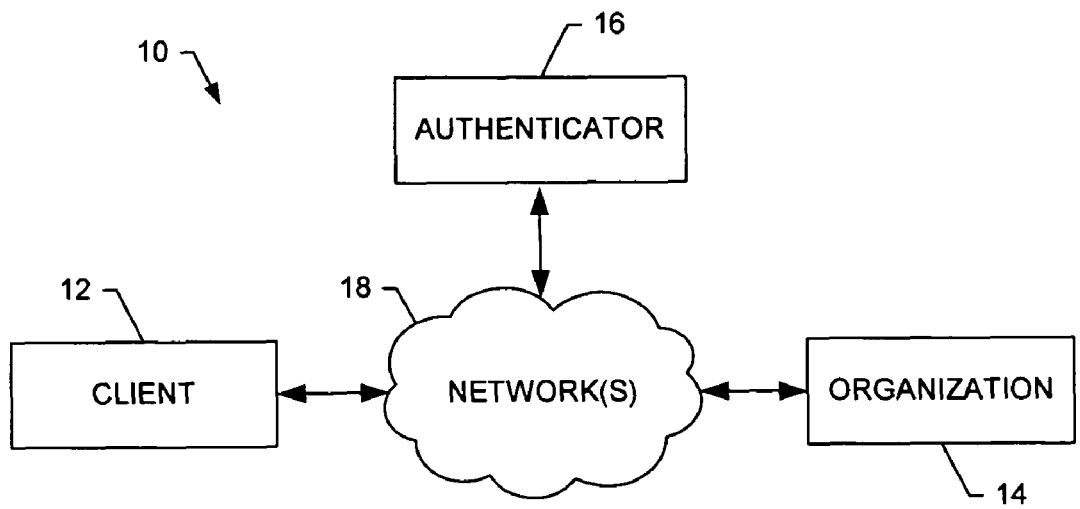
Figure 3:
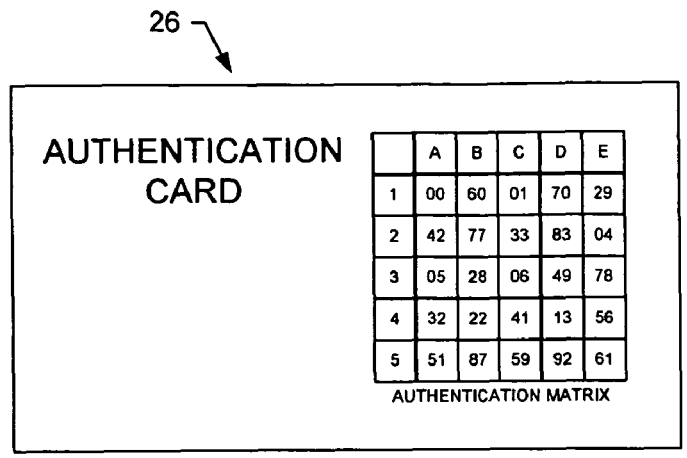
Figure 4:
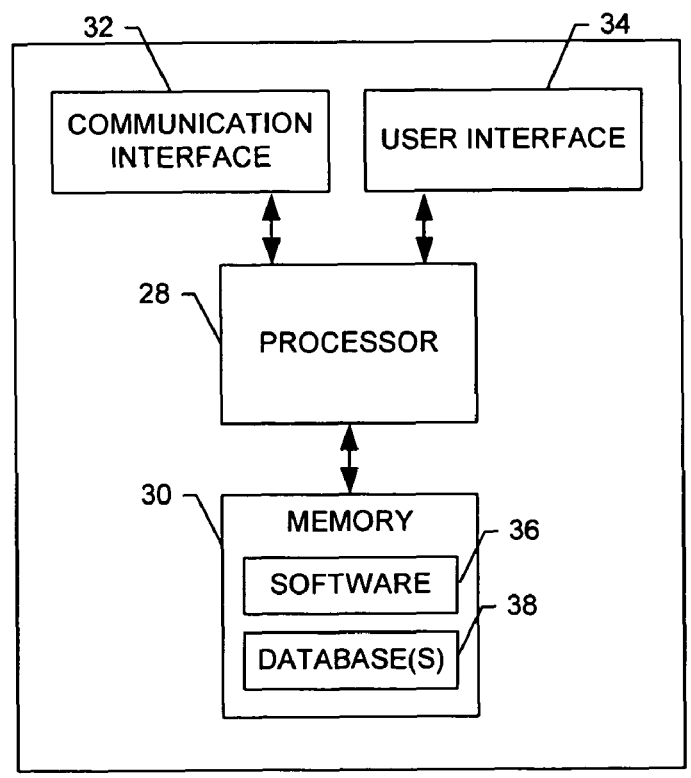
Figure 5:
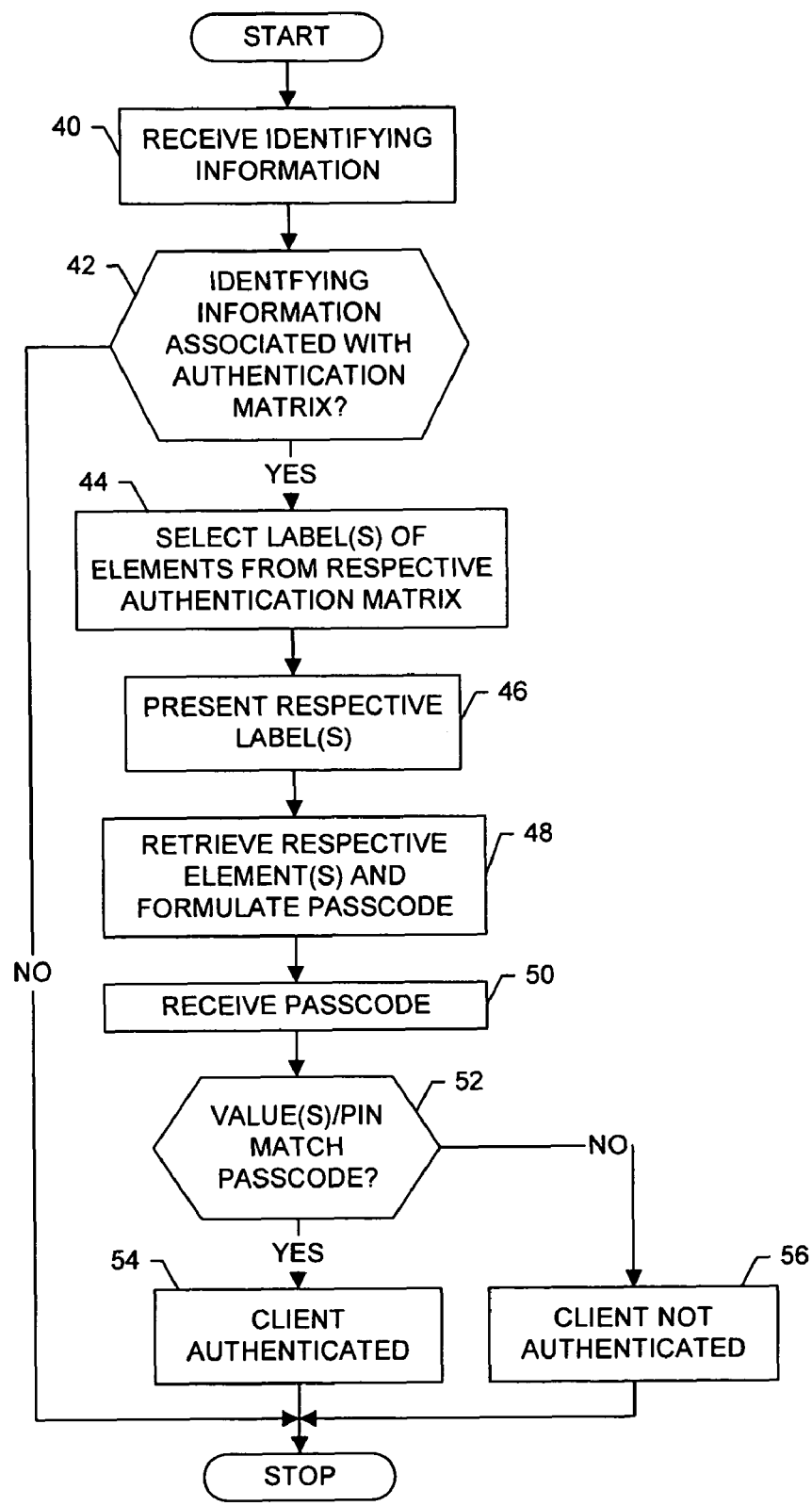
Figure 6:
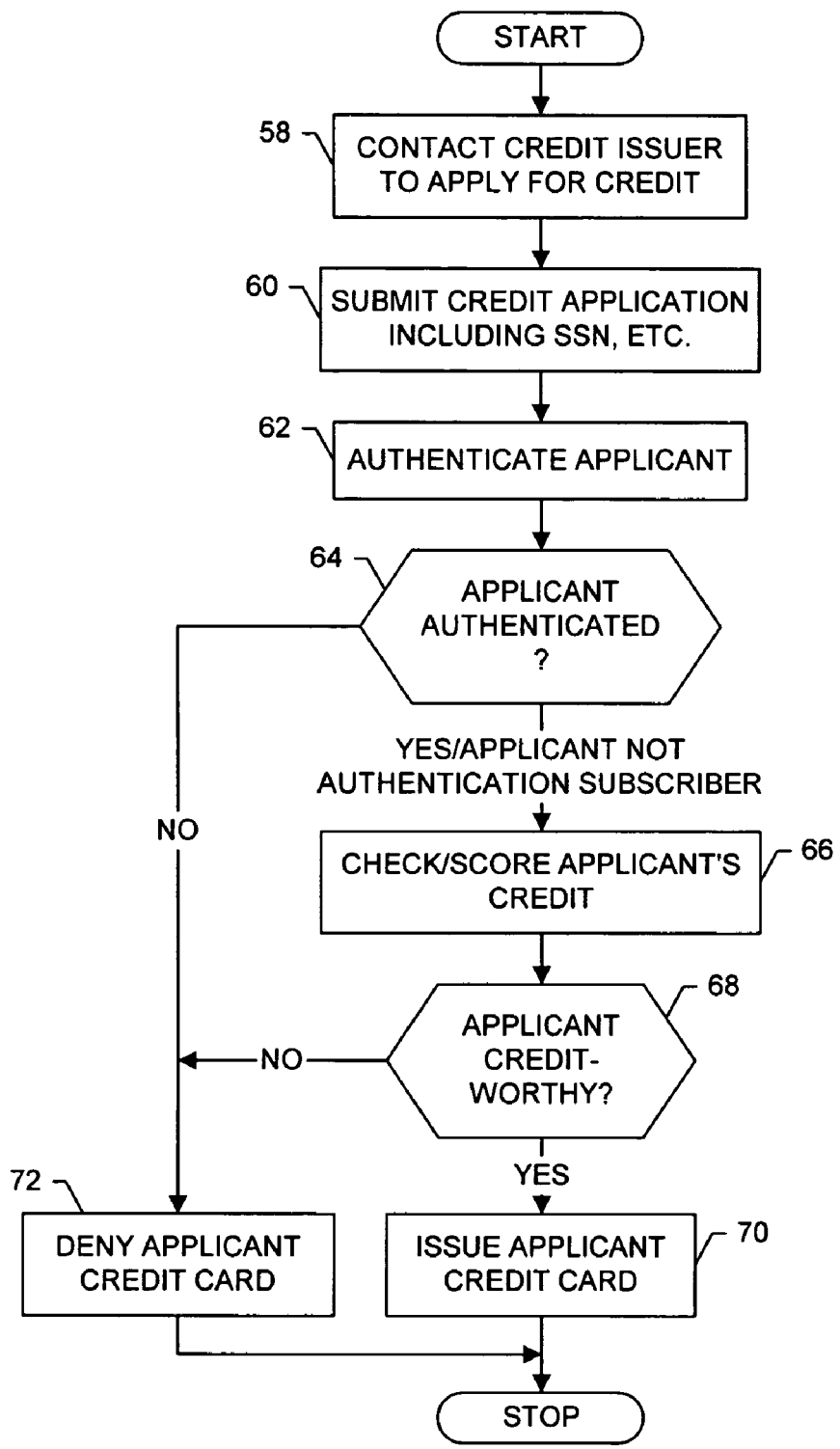

Having thus described the invention in general terms, reference will now be made to the accompanying drawings, which are not necessarily drawn to scale, and wherein:

FIG. 1 is a schematic block diagram of a system for authenticating a client in accordance with embodiments of the present invention;

FIG. 2 is a schematic block diagram of an authentication matrix, in accordance with one embodiment of the present invention;

FIG. 3 is a schematic block diagram of the authentication matrix of FIG. 2 in a paper-based embodiment;

FIG. 4 is a schematic block diagram of an entity capable of operating as a client, organization and/or authenticator, in accordance with embodiments of the present invention;

FIG. 5 is a flowchart illustrating various steps in a method of authenticating a client, in accordance with one embodiment of the present invention;

FIG. 6 is a flowchart illustrating various steps in a method of method of applying for credit, including authenticating the credit applicant, in accordance with one exemplar embodiment of the present invention; and FIGS. 7-20 are exemplar displays of one or more of a client, organization and authenticator, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for authenticating a client includes one or more clients 12, organizations 14 and authenticators 16 (one of each being shown). Each client is capable of directly and/or indirectly communicating with one or more organizations and authenticators. Similarly, each organization is capable of directly and/or indirectly communicating with one or more clients and authenticators; and each authenticator is capable of directly and/or indirectly communicating with one or more clients and organizations. In this regard, the client(s), organization(s) and authenticator(s) can be capable of directly and/or indirectly communicating with one another across one or more networks 18. The network(s) can comprise any of a number of different combinations of one or more different types of networks, including data and/or voice networks. For example, the network(s) can include one or more data networks, such as a local area network (LAN), a metropolitan area network (MAN), and/or a wide area network (WAN) (e.g., Internet), and include one or more voice networks, such as a public-switched telephone network (PSTN). For purposes of illustration, however, as described below, the network comprises the Internet (i.e., WAN) unless otherwise noted.

The client 12, organization 14 and authenticator 16 can comprise any one or more of a number of different entities, devices or the like capable of operating in accordance with embodiments of the present invention. In this regard, one or more of the client, organization and authenticator can comprise, include or be embodied in one or more processing elements, such as one or more of a laptop computer, desktop computer, server computer or the like. Additionally or alternatively, one or more of the client, organization and authenticator can comprise, include or be embodied in one or more portable electronic devices, such as one or more of a mobile telephone, portable digital assistant (PDA), pager or the like. For example, the client, organization and authenticator can each comprise a processing element capable of communicating with one another across the Internet (e.g., network 18).

It should be understood, however, that one or more of the client 12, organization 14 and authenticator 16 can comprise or otherwise be associated with a user carrying out the functions of the respective entity. For example, the client can comprise a client user communicating across a PSTN (e.g., network 18), by mail or in person with an organization user operating an organization processing element, where the organization user and processing element collectively comprise the organization. In such instances, the authenticator can comprise an authenticator processing element communicating across the Internet with the organization processing element. Alternatively, in such instances, the authenticator can comprise an authenticator user operating an authenticator processing element, where the authenticator user is capable of communicating with the organization user across a PSTN. As explained below, then, the term client can refer to a client including a client user and/or client processor. Similarly, an organization can refer to an organization including an organization user and/or organization processor; and an authenticator can refer to an authenticator including an authenticator user and/or authenticator processor.

Briefly, and as explained in greater detail below, the client 12 is capable of communicating with the organization 14 such as to request access to one or more services of the organization based upon an identity of the client. Before permitting the client to access the service(s), however, the organization may desire to authenticate the identity of the client. In such instances, the organization can be capable of communicating with the authenticator 16, which can be capable of directly or indirectly communicating with the client to authenticate the client. To facilitate authenticating the client, the client and authenticator are capable of storing, being provided with or otherwise having access to an authentication matrix unique to the respective client. Based upon the authentication matrix, then, the authenticator is capable of generating a dynamic passcode which the client can identify based upon the same authentication matrix to thereby authenticate the client, such as to an organization.

As shown in FIG. 2, each authentication matrix 20 can comprise a two-dimensional matrix including a predetermined number of elements 22 organized in columns and rows. It should be understood, however, that one or more authentication matrices can alternatively include one dimension, or more than two dimensions. For example, one or more authentication matrices can comprise a three-dimensional matrix. Irrespective of the number of dimensions of the authentication matrix, each element of the authentication matrix can comprise a value having one or more numbers and/or letters. It should also be understood that one or more elements of the matrix can alternatively comprise other values, objects (e.g., images) or the like, without departing from the spirit and scope of the present invention.

The authentication matrix 20 also includes a number of labels, each capable of identifying an element 22 of the authentication matrix. For example, each column and row of the matrix can include a respective header 24, where pairs of column and row headers collectively comprise labels capable of identifying the elements of the authentication matrix. Like each element, the header of each column and row can comprise a numeric, alphabetic or alphanumeric value, or alternatively any of a number of other values, objects or the like. As shown, each element comprises a two-digit numeric value, while each column header includes a single letter alphabetic value, and each row header includes a single digit numeric value. In this regard, each element can be identified by a label comprising the column header of the column including the respective element, followed by the row header of the row including the respective element. For example, the element comprising the value "28" can be identified by the column header "B" and the row header "3," or collectively by the label "B3."

Typically, each authentication matrix is unique to a client 12, and can be stored or otherwise accessed by the respective client and the authenticator 16. In this regard, while all authentication matrices can include common column and row headers, each authentication matrix can include a unique combination of the elements of the respective authentication matrix. Thus, while one client may be associated with the authentication matrix of FIG. 2, no other client is typically associated with an authentication matrix with every element having the same value as a corresponding element of the authentication matrix of FIG. 2.

Each authentication matrix 20 can be embodied in any of a number of different forms. In this regard, one or more authentication matrices can be stored by the respective client 12 and the authenticator 16. In such instances, the client can be capable of presenting the authentication matrix, such as on a display, to thereby permit the client user to identify a passcode based upon the authentication matrix. Alternatively, the client can be capable of operating in accordance with the stored authentication matrix to identify the passcode. Although the client and authenticator can be capable of storing the authentication matrices, one or more authentication matrices can additionally or alternatively have a paper-based embodiment. For example, as shown in FIG. 3, one or more authentication matrices can be printed on a card, such as on an authentication card 26 associated with or otherwise in the possession of the respective client and/or the authenticator.

Referring now to FIG. 4, a block diagram of an entity capable of operating as a client 10, organization 14 and/or authenticator 16 is shown in accordance with one embodiment of the present invention. Although shown as separate entities, in some embodiments, one or more entities may support one or more of a client, organization and/or authenticator, logically separated but co-located within the entit(ies). For example, a single entity may support a logically separate, but co-located, organization and authenticator. Also, for example, a single entity may support a logically separate, but co-located client and organization.

As shown, the entity capable of operating as a client 12, organization 14 and/or authenticator 16 can generally include a processor 28 connected to a memory 30. The processor can also be connected to at least one communication interface 32 or other means for transmitting and/or receiving data, content or the like. The processor can additionally be connected to a user interface 34 that can include a display and a user input interface. The user input interface, in turn, can comprise any of a number of devices allowing the entity to receive data from a user, such as a keypad, a touch display (not shown) or other input device.

The memory 30 can comprise volatile and/or non-volatile memory, and typically stores content, data or the like. In this regard, the memory typically stores software applications 36, instructions or the like for the processor to perform steps associated with operation of the entity in accordance with embodiments of the present invention. For example, the memory can store software applications such as one or more connectivity applications (e.g., Web browser, etc.). Also, for example, when the entity comprises an authenticator 16, the memory can store a software application comprising a passcode generator capable of dynamically generating one or more passcodes, as explained below. And when the entity comprises a client 12, for example, the memory can store a software application comprising a passcode identifier capable of identifying a passcode generated by the passcode generator, as is also explained below. As shown and described herein, the passcode generator and passcode identifier comprise software operated by the authenticator and client, respectively. It should be understood, however, that the passcode generator and/or passcode identifier can alternatively comprise firmware or hardware, without departing from the spirit and scope of the present invention.

The memory 30 can further store content, such as content transmitted from or received by the entity. For example, when the entity comprises a client 12, the memory can store an authentication matrix capable of being accessed by the passcode identifier and/or client user to identify a passcode generated by the authenticator 16, or more particularly the passcode generator of the authenticator. Also, for example, when the entity comprises an authenticator, the memory can store one or more databases 38, such as an authentication database.

The authentication database is capable of storing one or more pieces of identifying information associated with one or more clients 12, such as the names, addresses, birth dates, Social Security numbers (SSNs) or the like. In one typical embodiment, for example, the authentication database is capable of storing identifying information associated with client(s) that subscribe to an authentication service provided by the authenticator 16. Irrespective of the nature of the client(s) having associated identifying information stored by the authentication database, the authentication database is also capable of storing an authentication matrix associated with each respective client. In this regard, for each client, the authentication database is capable of storing associated piece(s) of identifying information and a unique authentication matrix. Thus, for each client, the piece(s) of identifying information can be associated with an authentication matrix.

As explained below, the identifying information and authentication matrices can be utilized to authenticate respective clients, such as to access the service(s) of one or more organizations 14.

In accordance with embodiments of the present invention, the authenticator 16, or more particularly the passcode generator, is capable of generating one or more dynamic passcodes unique to each client 12 based upon a respective authentication matrix. Each passcode generated based upon the respective authentication matrix, then, is capable of being used to authenticate the client, such as to an organization 14, to thereby permit the respective client to access service(s) of the organization. Advantageously, the passcode generator is capable of generating dynamic passcodes such that each passcode can be used to authenticate a respective client a limited number of times, typically once. As such, by reducing the number of instances the client can be authenticated with a single passcode, the system of embodiments of the present invention is capable of reducing instances of a generated passcode being stolen or otherwise used in an unauthorized manner, as such is often the case with static passcodes and passwords.

The passcode generator of the authenticator 16 is capable of generating each passcode for a respective client 12 in any of a number of different manners. In one embodiment, for example, the passcode generator is capable of generating each passcode by randomly selecting the labels of one or more of the elements of a respective authentication matrix, or alternatively by randomly selecting the elements for one or more elements of the respective authentication matrix. For example, from the authentication matrix shown in FIG. 2, the passcode generator can generate a passcode by randomly selecting the labels of three elements, such as labels "A3," "E1" and "B2," which correspond to the elements "05," "29" and "77," respectively. In such an instance, then, the passcode can include the corresponding elements, or "052977."

After generating each passcode, the respective passcode can be used to authenticate the respective client 12, such as in accordance with any of a number of different techniques. For example, after generating a passcode, the labels of the selected elements can be presented to the client. For example, continuing the above example, the client can be presented with the following labels: "A3 E1 B2." Upon being presented with the labels, the client or client user can retrieve the respective elements of the respective authentication matrix, also stored or otherwise possessed by the client.

The client 12 can retrieve the elements in any of a number of different manners. For example, the client, or more particularly the passcode identifier, can be capable of presenting the authentication matrix, such as on a display of the client, to thereby permit the client user to retrieve the elements. Alternatively, the passcode identifier of the client can be capable of operating in accordance with the stored authentication matrix to identify the passcode based upon the labels of the selected elements. Although the client and authenticator can be capable of storing the authentication matrices, one or more authentication matrices can additionally or alternatively have a paper-based embodiment. In such instances, the client user can retrieve the passcode from the paper-based authentication matrix. Irrespective of how the client retrieves the elements of the authentication matrix corresponding to the presented labels, the client can thereafter present the selected elements (e.g., "052977"). Then, if the presented elements match the corresponding elements of the authentication matrix stored in the authentication database for the respective client, or otherwise match the elements of the passcode, the user is authenticated. Otherwise, the user is not authenticated.

To further secure the authentication matrix from unauthorized use in authenticating an unauthorized user on behalf of the client, the passcode can be configured to further include a personal identification number (PIN) associated with the respective client 12, and known only to the authenticator 16 and the respective client. The PIN is typically a numeric value including one or more digits, but it should be understood that the PIN can alternatively comprise an alphabetic value, alphanumeric value, or any of a number of other values, objects or the like. Irrespective of the value or nature of the PIN, each passcode generated for one or more clients can be configured to further include the PIN at any one or more predefined positions with respect to the element(s) corresponding to the randomly selected label(s) of the authentication matrix. In one advantageous embodiment, however, not only is the PIN known only to the authenticator and the client, but the predefined position(s) of the PIN with respect to the element(s) of the authentication matrix is also known only to the authenticator and the client. Thus, the PIN as well as the predefined position(s) of the PIN with respect to the element(s) of the authentication matrix corresponding to the randomly selected label(s) can vary from client to client, and can be stored, for example, within the authentication database along with associated identification information and authentication matrices.

Continuing the above example, then, presume that the client 12 associated with the authentication matrix of FIG. 2 is also associated with the PIN "19," and that the passcode is configured to include the PIN before the element(s) of the authentication matrix corresponding to randomly selected label(s) of the respective element(s). Again presume that the client is presented with the following labels: "A3 E1 B2." Upon being presented with the labels, the client or client user can again retrieve the elements corresponding to the respective labels from the respective authentication matrix, also stored or otherwise possessed by the client. Thereafter, in addition to presenting the elements (e.g., "052977"), the client can also present the PIN "19" before the elements form the authentication matrix, for a passcode of "19052977." If the presented elements match the corresponding elements of the authentication matrix stored in the authentication database for the respective client, and the PIN value and placement are correct for the respective client, the user is authenticated. Otherwise, the user is not authenticated.

Reference is now made to FIG. 5, which illustrates various steps in a method of authenticating a client 12 in accordance with one embodiment of the present invention. As shown in block 40, a method of authenticating a client includes the authenticator 16 receiving one or more piece(s) of identifying information associated with the client. For example, the authenticator can receive a SSN associated with a client or client user, such as from the client or, more typically, from an organization 14 in response to a request from the client for service(s) of the organization. Then, as shown in block 42, the authenticator can determine if the client has associated identifying information and an associated authentication matrix stored in the authentication database (e.g., database 38) of the authenticator, such as by matching one or more of the piece(s) of identifying information received by the authenticator with corresponding piece(s) of identifying information stored in the authentication database.

If the client 12 has associated identifying information and an associated authentication matrix stored in the authentication database (e.g., database 38) of the authenticator 16, the authenticator, or more particularly the passcode generator, can generate a passcode based upon the respective authentication matrix. More particularly, as shown in block 44, the passcode generator can randomly select the labels of one or more of the elements of the respective authentication matrix (e.g., "A3 E1 B2"). Thereafter, the authenticator can present the randomly selected labels of the authentication matrix to the client, such as directly or via an organization 14, as shown in block 46.

Upon being presented with the labels, the client 12 can retrieve the elements corresponding to the respective labels from the respective authentication matrix, also stored or otherwise possessed by the client, as shown in block 48. As indicated above, the client can retrieve the elements in any of a number of different manners. For example, the client, or more particularly the passcode identifier, can be capable of presenting the authentication matrix, such as on a display of the client, to thereby permit the client user to retrieve the elements. Alternatively, for example, the passcode identifier of the client can be capable of operating in accordance with the stored authentication matrix to identify the passcode based upon the labels, which can be input into or otherwise received by the passcode identifier. Further, for example, when the authentication matrix is paper-based, the client user can retrieve the passcode from the paper-based authentication matrix.

Irrespective of how the client 12 retrieves the elements of the authentication matrix corresponding to the presented labels, the client can thereafter formulate the passcode, including the elements (e.g., "052977") and the PIN associated with the client, in the order associated with the client (e.g., "19052977"), as also shown in block 48. Thereafter, the client can send, and the authenticator can receive 16, the passcode directly or via the organization 14, as shown in block 50. The authenticator can then determine if the passcode sent by the client matches the passcode generated by the passcode generator, including the selected elements of the authentication matrix and the PIN in the correct order, as shown in block 52. If a match is found, the client is authenticated, as shown in block 54. Otherwise, the client is not authenticated, as shown in block 56.

Referring now to FIG. 6, in an example scenario employing an embodiment of the present invention, consider an applicant (i.e., client 12) applying for a credit card from a credit issuing institution or credit issuer (i.e., organization 14). In such an instance, the applicant can contact the credit issuer to apply for the credit card, such by operating a Web browser and accessing a Web site of the credit issuer, as shown in block 58. As is typical, to apply for the credit card, the applicant submits, and the credit issuer receives, a credit application that includes a number of pieces of identifying information, such as the applicant's name, address, date of birth and SSN, as shown in the exemplar display of FIG. 7 and block 60 of FIG. 6. Upon receiving the identifying information, the credit issuer attempts to authenticate the applicant, as shown in blocks 62 and 64. In this regard, in accordance with one embodiment of the present invention, the credit issuer can attempt to authenticate the applicant in a manner such as that described above with respect to FIG. 5.

More particularly, for example, after the applicant (i.e., client 12) submits the credit application, the credit issuer (i.e., organization 14) can securely transmit the applicant's SSN to an authentication service (i.e., authenticator 16) supporting the credit issuer. In turn, the authentication service can query the SSN against an authentication database maintained by the authentication service. If the SSN is found within the authentication database, the applicant can be requested to authenticate himself/herself to the authentication service. In this regard, the authentication service can present the applicant, directly or via the credit issuer, a set of three authentication matrix labels (e.g., E2 C2 C3), such as on a window of the Web browser operated by the applicant, as shown in the exemplar display of FIG. 8. As explained above, the authentication matrix labels can be randomly generated by a passcode generator of the authentication service from an authentication matrix stored in the authentication database and associated with the applicant, or applicant's SSN.

In addition to the three authentication matrix labels, the authentication service (i.e., authenticator 16) can provide a means, such as a text field of a presented Web page window, for the applicant (i.e., client 12) to input the passcode corresponding to the presented authentication matrix labels. The applicant can thereafter retrieve the elements corresponding to the presented authentication matrix labels from the authentication matrix stored or otherwise accessible by the applicant, which should comprise the same authentication matrix associated with the applicant or applicant's SSN stored in the authentication database.

The applicant can retrieve the elements in a number of different manners, such as from a paper-based authentication matrix. Alternatively, for example, the client can possess or otherwise operate a processing element (e.g., laptop computer, desktop computer, server computer, etc.) or portable electronic device (e.g., mobile telephone, portable digital assistant (PDA), pager, etc.) capable of communicating with a passcode identifier. The passcode identifier can, in turn, drive a display of the processing element or portable electronic device to request the presented authentication matrix labels, as shown in the exemplar display of FIG. 9. Thereafter, the passcode identifier can receive the authentication matrix labels, and from a stored authentication matrix, identify the passcode based upon the labels, which can be presented to the application, as shown in the exemplar display of FIG. 10.

After retrieving the elements, the applicant (i.e., client 12) can formulate and input, such as into the text field of the presented Web page window, the corresponding passcode (e.g., 92043306) including the elements (i.e., 043306) and a PIN (i.e., 92) associated with the applicant in a predefined order (i.e., at the beginning). Upon inputting the passcode, the authentication service (i.e., authenticator 16) can receive, and thereafter check the validity of, the passcode. If the authentication service successfully validates the passcode, the applicant is authenticated, and the authentication service can notify the applicant, such as on a window of the Web browser operated by the applicant, as shown in the exemplar display of FIG. 11. Additionally, the authentication service can notify the credit issuer (i.e., organization 14) of the authentication. Otherwise, the applicant is not authenticated. In such instances that the applicant is not authenticated, the authentication service can permit the applicant to again input the correct passcode. If after a predefined number of times of inputting an incorrect passcode, or after a predetermined timeout period, the applicant has not been authenticated, however, the authentication service can notify the applicant and/or credit issuer of the authentication failure. In such instances, the credit issuer can deny the credit card to the applicant.

If the applicant (i.e., client 12) is authenticated, the credit issuer (i.e., organization 14) can continue with a process of determining whether to issue credit to the applicant. Likewise, if the authentication service (i.e., authenticator 16) did not locate the applicant's SSN in the authentication database, such as when the applicant does not subscribe to the authentication service, the credit issuer can continue with a process of determining whether to issue credit to the applicant. Thus, in instances such as those in which the applicant is not a subscriber to the authentication service, the authentication technique of embodiments of the present invention can be configured to operate in a manner completely transparent to the applicant, and in a manner that does not interfere with the application process by producing false positives.

More particularly as to determining whether to issue credit to the applicant (i.e., client 12), for example, the credit issuer (i.e., organization 14) can check and score the applicant's credit, as shown in block 66. Thereafter, the credit issuer can determine the applicant's creditworthiness based upon the applicant's credit score, as shown in block 68. In this regard, if the applicant is creditworthy, the credit issuer can issue the applicant a credit card, as shown in block 70. If the applicant is not creditworthy, however, the credit issuer can deny the applicant the credit card, as shown in block 72.

As will be appreciated, in various instances it may not be desirable for the applicant (i.e., client 12) to directly access the credit issuer (i.e., organization 14), and thus the authentication service (i.e., authenticator 16). In such instances, for example, the method of applying for credit, including authenticating the applicant, can occur in the same manner as described above, except that the credit issuer can be configured to issue credit based upon the creditworthiness of the applicant pending authentication of the applicant. Presuming the credit issuer decides to issue the credit card based upon the creditworthiness of the applicant, after issuing the credit card, the credit issuer can contact the applicant or direct the applicant to contact the credit issuer, such via telephone across a PSTN, by mail or in person. After establishing contact, then, the credit issuer, or more particularly an employee of the credit issuer, can contact the authentication service to authenticate the applicant, such by operating a Web browser and accessing a Web site of the authentication service.

After contacting the authentication service (i.e., authenticator 16), the employee of the credit issuer (i.e., organization 14) can input, such as into a text field of a presented Web site, the applicant's (i.e., client's 12) SSN from the credit application, as shown in the exemplar display of FIG. 12. The authentication technique can then proceed, as before, with the authentication service querying the SSN against an authentication database maintained by the authentication service. Presuming the SSN is found within the authentication database, the authentication service can present the employee the authentication matrix labels, such as on a window of the Web browser operated by the employee (see FIG. 8). The employee can then indicate the authentication matrix labels to the applicant. The applicant can again retrieve the corresponding passcode, although in this instance, the applicant thereafter communicates the passcode (including the PIN in the correct order) to the employee, such as over the telephone, by mail or in person. As will be appreciated, in such instances, the applicant can confidently communicate the passcode to the employee because the passcode is dynamic in nature, and can change from transaction to transaction. Upon receiving the passcode, the employee can input the passcode, such as into the text field of the presented Web page window. As before, the authentication service can thereafter receive, and check the validity of, the passcode to thereby authenticate the applicant (see FIG. 11).

In various other instances in which it is not desirable for the applicant (i.e., client 12) to directly access the credit issuer (i.e., organization 14), and thus the authentication service (i.e., authenticator 16), it may be desirable to permit the credit issuer to authenticate the applicant without the credit issuer contacting the applicant, or directing the applicant to contact the credit issuer, such as over the telephone or in person. For example, it may be desirable to permit the applicant to submit a credit application, such as by mail, where the credit application allows the credit issuer to determine whether to issue credit to the applicant, as well as authenticate the applicant. In such instances, the credit application can be configured to include a predefined set of authentication matrix labels. Since the labels can be common to all clients (i.e., applicants), the same labels can be presented to any number of different applicants, while still corresponding to passcodes unique to the respective applicants. And since the labels are predefined, the labels can be included in on-line (e.g., Web-based) credit applications, as well as paper-based applications.

From the predefined set of authentication matrix labels, the applicant (i.e., client 12) can retrieve the passcode, as before, and input the passcode into or onto the credit application. For an exemplar paper-based credit application including a predefined set of authentication matrix labels and a corresponding passcode, see FIG. 13 (authentication matrix labels "A3 E1 B2" shown at the bottom of the application). Thereafter, the applicant can send the credit application, including the predefined authentication matrix labels and passcode, to the credit issuer (i.e., organization 14). Then, as before, the credit issuer, or more particularly an employee of the credit issuer, can contact the authentication service (i.e., authenticator 16) to authenticate the applicant, such by operating a Web browser and accessing a Web site of the authentication service. After contacting the authentication service, the employee of the credit issuer can input, such as into a text field of the presented Web page, the applicant's SSN from the credit application (see FIG. 12, indicating that the application comprises a paper application).

The authentication technique can then proceed, as before, with the authentication service (i.e., authenticator 16) querying the SSN against an authentication database maintained by the authentication service. In instances where the SSN is found within the authentication database, the authentication service can request, from the employee, the authentication matrix labels included within or on the credit application, as well as the corresponding passcode provided by the applicant, as shown in the exemplar display of FIG. 14. The employee can then input the authentication matrix labels and corresponding passcode from the credit application, such as into the text field of the presented Web page window. As before, the authentication service can thereafter receive the labels and passcode, and check the validity of the passcode based upon the labels, PIN and placement of the authentication matrix elements with respect to the PIN to thereby authenticate the applicant (i.e., client 12).

As will be appreciated, in any instance of the authenticator 16 authenticating a client 12, the client typically registers with the authenticator to thereby setup or establish an account with the authenticator before the authenticator authenticates the client. By establishing an account with the authenticator, the client can provide the authenticator with one or more pieces of identifying information. The authenticator can thereafter associate one or more of the provided piece(s) of identifying information with an authentication matrix and store the authentication matrix and associated piece(s) of identifying information in the authentication database. The authenticator can also send or otherwise transmit the associated authentication matrix to the client for subsequent use in retrieving elements to formulate passcodes dynamically generated by the authenticator.

More particularly, a client 12 establishing an account with the authenticator 16 generally includes the authenticator (a) verifying the client's identity based upon piece(s) of identifying information associated with the client, (b) entering the client's information into the databases, and (c) activating the account. In this regard, the authenticator can verify the identity of the client in any of a number of different manners. In one embodiment, for example, the authenticator can directly enroll clients, or indirectly enroll clients via organizations 14, such as financial institutions, having a preexisting relationship with the respective clients. In this embodiment, the authenticator can then be configured to verify the client's identity based upon the technique for enrolling the client.

To directly enroll with the authenticator 16 in accordance with one exemplar embodiment, a client 12 can be instructed to send the authenticator one or more piece(s) of identifying information, such as in an enrollment application. Also, the client can be instructed to send the authenticator one or more identifying documents. For example, the authenticator can instruct the client to send one or more previous client-specific W-2 tax forms, asset sales with tax records, and/or utility bills or the like that can be independently cross-checked by the authenticator. Additionally or alternatively, for example, if the client user is a homeowner, the authenticator can instruct the client to send certified copies of the client's mortgage note and/or deed evidencing the client's homeownership.

After the authenticator 16 receives the enrollment application and identifying documents from the client 12, the authenticator can check the identifying information and identifying documents to thereby verify the client. For example, the authenticator can check a number of pieces of identifying information, as well as identifying documents, by cross-checking the same against information found in a conventional credit report. And when the identifying documents include copies of the client's mortgage note and/or deed, such information can be cross-checked against public records. Irrespective of the forms of identifying documents and how the piece(s) of identifying information and identifying documents are checked, however, the authenticator can thereafter temporarily maintain such information and documents. For example, the authenticator can temporarily maintain the piece(s) of identifying information and identifying documents by scanning and saving the application and identifying documents in an electronic file associated with the client, and thereafter destroying any such documents existing in paper form.

In contrast to directly enrolling a client 12, to enroll a client via an organization 14 having a preexisting relationship with the respective clients, it is typically presumed that the client has previously established a relationship with a respective organization and demonstrated the relationship's legitimacy over time. Thereafter, for example, when a client desires to establish an account with the authenticator 16, the system enables the organization to generate a unique password, which can be sent to the client and the authenticator. For an organization comprising a financial institution such as a bank or credit issuer, the authenticator can also make a small deposit of funds into the client's bank account or a small charge of funds to the client's credit card account. Then, when the client contacts the authenticator to enroll, the authenticator can request, and thereafter receive from the client, in addition to an enrollment application, the password previously provided to the client and authenticator by the organization. In addition, the authenticator can request and receive an indication of the amount of funds deposited or charged to the client's financial institution account and/or the account number of the account to which the authenticator deposited or charged the amount of funds. After receiving the password, amount of funds and/or account number, the authenticator can check the same to thereby verify the client.

Irrespective of whether the authenticator 16 directly enrolls a client, or indirectly enrolls the client 12 via an organization 14 having a preexisting relationship with the client, after verifying the client, the authenticator can issue an account number to the client, and contact the client, or direct the client to contact the authenticator, to complete the account establishment. Once the client and authenticator are in contact, the authenticator can verify the client, such as by querying, from the client, one or more pieces of identifying information and/or identifying documents (when the client directly enrolls with the authenticator), or identifying information and/or password, amount of funds and/or account number (when the client enrolls with the authenticator via an organization). Thereafter, the client can be presented with one or more identification queries, and provide the authenticator with corresponding answers unique to the client and therefore capable of identifying the client to the authenticator. For example, the client can be presented with identification queries such as "What high school did you attend?," "What was the name of your favorite high school teacher?" or the like, and solicit answers unique to the client. The queries can be presented in any of a number of different manners. For example, the authenticator can present the queries from a listing of queries available to the authenticator. Additionally or alternatively, one or more of the queries can be presented by the client itself, and thereafter communicated to the authenticator along with the corresponding answers. As such, the queries can be capable of being fully customizable to the client.

After receiving the answers to the identification queries, the queries and corresponding answers can be stored by the authenticator 16 along with the client account number, such as in a client identification database (e.g., database 38) separate from the authentication database. Like the authentication database, however, the identification database is capable of storing one or more piece(s) of identifying information associated with one or more clients 12. For example, the identification database can store the names, addresses, birth dates, SSNs or the like for one or more clients. In addition, the identification database can store one or more pieces of information, instructions or the like capable of authenticating the client to the authenticator including, for example, the identification queries and corresponding answers. Irrespective of the exact contents of the client identification database, after storing the piece(s) of identifying information and identification queries/answers, if so desired, the electronic file (saved when the client directly enrolled with the authenticator) including the application and identifying documents associated with the client can be deleted for security purposes.

After storing the piece(s) of identifying information and identification queries/answers associated with the client 12, one or more of the piece(s) of identifying information can be transferred to the authentication database. Thereafter, an authentication matrix can be associated with the transferred piece(s) of identifying information to thereby include the client within the authentication database. Before associating the authentication matrix with the identifying information, however, the authenticator 16 can be capable of generating the authentication matrix, typically in a manner such that the authentication matrix is unique among other authentication matrices for other clients included within the authentication matrix. The authenticator can then send, to the client, the same authentication matrix stored for the client such that the client can subsequently use the authentication matrix to authenticate the client.

As will be appreciated, by storing identification queries and corresponding answers for the client 12, the client can be capable of being authenticated to the authenticator 16 independent of a dynamic passcode generated based upon a respective authentication matrix. For example, the authenticator can be capable of authenticating the client independent of a dynamic passcode to activate the client's authentication matrix (including providing a PIN and predefined position relative to authentication matrix elements), and/or obtain one or more services of the authenticator. In this regard, to authenticate the client, the client, or more particularly the client user, can identify himself/herself to the authenticator and provide a respective account number on-line, over the telephone or in person, for example. The client can then be presented with one or more of the identification queries associated with the client and stored in the client identification database. Similarly, when the client identifies himself/herself to the authenticator and provides a respective account number over the telephone or in person, the authenticator, or more particularly an authenticator user, can be presented with one or more of the respective identification queries. In such instances, the authentication user can, in turn, present the identification queries to the client. After being presented with the queries, the authenticator can receive, from the client, the corresponding answers, again on-line, over the telephone or in person. Then, if the answers received from the client match those stored in the client identification database corresponding to the respective queries, the client is authenticated to the authenticator. Otherwise, the client is not authenticated to the authenticator.

As shown and described herein, the system and method of embodiments of the present invention has application to reduce identity theft, particularly as it relates to fraud related to credit or other financial applications or access to service(s) of respective organization(s). For example, embodiments of the present application can be used in a complete client identification system for organizations, such as large financial institutions, that offer many services. In this regard, by providing a range of functions—from verifying the identities of credit card, checking, or brokerage account applicants to verifying the identity of existing customers before making a wire transfer or withdrawals—embodiments of the present invention can significantly reduce fraud associated with improper or incomplete client identification.

It should be understood, however, that the system, method and computer program product of embodiments of the present invention generally has application in any instance where it is desirable to authenticate a client. For example, embodiments of the present invention can be utilized to authenticate a client during attempted use of service(s) of an organization, such as during attempted use of a credit card issued by a credit card issuing institution, as shown in the exemplar displays of FIG. 15, as well as FIGS. 8 and 11.

Also, for example, embodiments of the present invention can be utilized in digital signature techniques, as shown in the exemplar displays of FIGS. 16-18. In addition, for example, embodiments of the present invention can be utilized to control a client's account access with organizations, such as brokerage account access with an on-line brokerage, as shown in the exemplar displays of FIGS. 19 and 20.

As also described above, the system 10 can include, and the authenticator 16 can be capable of authenticating, one or more clients 12 such as in response to requests from the clients to access the service(s) of one or more organizations 14. It should be understood, however, that the system can, and typically does include a plurality of clients. Each can be authenticated by one or more authenticators, each of which can be capable of authenticating client(s) for one or more organizations. For example, the system can include a plurality of customers, each capable of being authenticated by an authenticator in response to the customers attempting to access the service(s) of organizations such as financial institutions or the like.

In addition, whereas the authenticator(s) 16 can be capable of authenticating client(s) 12 in response to requests from the client(s) to access the service(s) of organization(s) 14, the authenticator can be capable of authenticating one or more clients based upon a dynamic passcode and independent of an organization. In one such instance, the authenticator can be capable of authenticating the client, such as in the same manner as described above. After authenticating the client, then, the authenticator can permit the client to request access to service(s) of one or more organizations. For example, after authenticating the client, the authenticator or another entity can be capable of presenting a Web portal to the client, where the Web portal includes links to Web sites providing the service(s) of organization(s). Upon selecting a link to one of the Web sites, then, the authenticator can be capable of communicating with the respective organization in a secure manner to indicate that the client has already been authenticated should the client request access to service(s) requiring authentication.

According to one aspect of the present invention, all or a portion of the system of the present invention, such as all or portions of the client 12, organization 14 and/or authenticator 16, generally operates under control of a computer program product (e.g., passcode generator, passcode identifier, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 5 and 6 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the control flow diagrams support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to send, to a client, a set of a plurality of labels identifying a respective plurality of elements of an authentication matrix, the authentication matrix including a plurality of elements organized in one or more columns and rows each of which includes a respective non-time based header, each element being identifiable by a label including a column header and row header that identifies the respective column and row of the element, the set of labels including the column headers and row headers of the respective labels being unknown at the client until the set of labels is sent thereto,
wherein the processor is configured to receive a passcode from the client formulated based upon the elements identified by the set of labels, and wherein the processor is configured to authenticate the client based upon the formulated passcode.

2. An apparatus according to claim 1, wherein the processor is configured to send a set of labels, receive a formulated passcode and authenticate the client a plurality of times, and wherein the processor is configured to send each set of labels such that the sent set of labels differs from each previously sent set of labels.

3. An apparatus according to claim 1, wherein the processor is configured to generate a passcode based upon elements selected from the authentication matrix, wherein the processor is configured to send a set of labels identifying the selected elements, and wherein the processor is configured to authenticate the client further based upon the generated passcode.

4. An apparatus according to claim 3, wherein the processor is configured to provide, to the client, an authentication matrix stored in a database, wherein the processor is configured to generate a passcode based upon elements selected from the authentication matrix stored in the database, and wherein the processor is configured to receive a passcode formulated based upon elements of the authentication matrix provided to the client corresponding to the elements selected from the authentication matrix stored in the database.

5. An apparatus according to claim 4, wherein the database is configured to store a plurality of authentication matrices, each authentication matrix associated with a different client, wherein the processor is configured to provide, to the client being authenticated, an authentication matrix associated with the respective client, and wherein the processor is configured to generate a passcode based upon elements selected from the authentication matrix stored in the database and associated with the respective client.

6. An apparatus according to claim 5, wherein the processor is configured to receive at least one piece of identifying information associated with the client being authenticated, and thereafter identify, from the plurality of authentication matrices stored in the database, the authentication matrix associated with the client being authenticated based upon the at least one piece of identifying information, and wherein the processor is configured to generate a passcode based upon elements selected from the identified authentication matrix.

7. An apparatus according to claim 3, wherein the processor is configured to generate a passcode further based upon a personal identification number (PIN) associated with the client, and wherein the processor is configured to receive a passcode formulated further based upon the PIN.

8. An apparatus according to claim 7, wherein the processor is configured to generate a passcode including elements selected from the authentication matrix and the PIN in a variable position with respect to the selected elements, wherein the processor is configured to receive a passcode formulated to include the identified elements and the PIN in the variable position with respect to the identified elements, and wherein the processor being configured to authenticate the client by identifying a match between the generated passcode and the formulated passcode.

9. An apparatus comprising:
a processor configured to receive a set of a plurality of labels identifying a respective plurality of elements of an authentication matrix, the authentication matrix including a plurality of elements organized in one or more columns and rows each of which includes a respective non-time based header, each element being identifiable by a label including a column header and row header that identifies the respective column and row of the element, the set of labels including the column headers and row headers of the respective labels being unknown at the apparatus until the set of labels is received by the processor,
wherein the processor is configured to formulate or receive a formulated passcode based upon the elements identified by the received set of labels to thereby enable authentication of the apparatus or a user of the apparatus based upon the formulated passcode.

10. An apparatus according to claim 9, wherein the processor is configured to receive the set of labels and formulate or receive a formulated passcode a plurality of times to thereby enable authentication of the apparatus or user a plurality of times, and wherein each set of labels received by the processor differs from each set of labels previously received by the processor.

11. An apparatus according to claim 9, wherein the processor is configured to receive a set of labels identifying elements selected from the authentication matrix during generation of a passcode, and wherein the processor is configured to formulate or receive the formulated passcode to thereby enable authentication of the apparatus or user further based upon the generated passcode.

12. An apparatus according to claim 11, wherein an authentication matrix is configured for provision to the apparatus or user from an authenticator configured to store an authentication matrix, wherein the processor is configured to receive a set of labels identifying elements selected from the authentication matrix stored by the authenticator, and wherein the processor is configured to formulate or receive a formulated passcode based upon elements of the authentication matrix provided to the apparatus or user corresponding to the elements selected from the authentication matrix stored by the authenticator.

13. An apparatus according to claim 12, wherein the authentication matrix configured for provision to the apparatus or user is associated with the respective apparatus or user, the respective authentication matrix being configured for provision from an authenticator configured to store a plurality of authentication matrices, each authentication matrix associated with a different apparatus or user, and wherein the processor is configured to receive a set of labels identifying elements selected from the authentication matrix stored by the authenticator and associated with the respective apparatus or user.

14. An apparatus according to claim 13, wherein the processor is configured to send the authenticator at least one piece of identifying information associated with the respective apparatus or user to thereby enable the authenticator to identify, from the plurality of authentication matrices, the authentication matrix associated with the respective apparatus or user based upon the at least one piece of identifying information, and wherein the processor is configured to receive a set of labels identifying elements selected from the identified authentication matrix.

15. An apparatus according to claim 11, wherein the processor is configured to receive a set of labels identifying elements selected from the authentication matrix during generation of a passcode based upon a personal identification number (PIN) associated with the processor, and wherein the processor is configured to formulate or receive a formulated passcode further based upon the PIN.

16. An apparatus according to claim 15, wherein the processor is configured to receive a set of labels identifying elements selected from the authentication matrix during generation of a passcode including elements selected from the authentication matrix and the PIN in a variable position with respect to the selected elements, wherein the processor is configured to formulate or receive a formulated passcode including the identified elements and the PIN in the variable position with respect to the identified elements to thereby enable authentication of the apparatus or user by identifying a match between the generated passcode and the formulated passcode.

17. A method of authenticating a client comprising:
sending, to a client, a set of a plurality of labels identifying a respective plurality of elements of an authentication matrix, the authentication matrix including a plurality of elements organized in one or more columns and rows each of which includes a respective non-time based header, each element being identifiable by a label including a column header and row header that identifies the respective column and row of the element, the set of labels including the column headers and row headers of the respective labels being unknown at the client until the set of labels is sent thereto;
receiving a passcode formulated based upon the elements identified by the received set of labels; and
authenticating the client based upon the formulated passcode.

18. A method according to claim 17, wherein sending a set of labels, receiving a passcode and authenticating the client occur a plurality of times, and wherein each sent set of labels differs from each previously sent set of labels.

19. A method according to claim 17 further comprising:
generating a passcode based upon elements selected from the authentication matrix,
wherein sending a set of labels comprises sending a set of labels identifying the selected elements, and
wherein authenticating the client comprises authenticating the client further based upon the generated passcode.

20. A method according to claim 19 further comprising:
providing an authentication matrix to an authenticator, and providing an authentication matrix to the client,
wherein generating a passcode comprises generating a passcode based upon elements selected from the authentication matrix provided to the authenticator, and
wherein receiving a passcode comprises receiving a passcode formulated based upon elements of the authentication matrix provided to the client corresponding to the elements selected from the authentication matrix provided to the authenticator.

21. A method according to claim 20, wherein providing an authentication matrix to an authenticator comprises providing a plurality of authentication matrices to an authenticator, each authentication matrix associated with a different client, wherein providing an authentication matrix to the client comprises providing, to the client being authenticated, an authentication matrix associated with the respective client, and
wherein generating a passcode comprises generating a passcode based upon elements selected from the authentication matrix provided to the authenticator and associated with the respective client.

22. A method according to claim 21 further comprising:
receiving at least one piece of identifying information associated with the client being authenticated; and
identifying, from the plurality of authentication matrices, the authentication matrix associated with the client being authenticated based upon the at least one piece of identifying information,
wherein generating a passcode comprises generating a passcode based upon elements selected from the identified authentication matrix.

23. A method according to claim 19, wherein generating a passcode comprises generating a passcode further based upon a personal identification number (PIN) associated with the client, and wherein receiving a passcode comprises receiving a passcode formulated further based upon the PIN.

24. A method according to claim 23, wherein generating a passcode comprises generating a passcode including elements selected from the authentication matrix and the PIN in a variable position with respect to the selected elements, wherein receiving a passcode comprises receiving a passcode formulated to include the identified elements and the PIN in the variable position with respect to the identified elements, and wherein authenticating the client comprises identifying a match between the generated passcode and the formulated passcode.

25. A computer program product for authenticating a client, the computer program product comprising at least one non-transitory computer-readable storage medium having computer-readable program code portions stored therein, the computer-readable program code portions comprising:
a first executable portion configured to send, to a client, a set of a plurality of labels identifying a respective plurality of elements of an authentication matrix, the authentication matrix including a plurality of elements organized in one or more columns and rows each of which includes a respective non-time based header, each element being identifiable by a label including a column header and row header that identifies the respective column and row of the element, the set of labels including the column headers and row headers of the respective labels being unknown at the client until the set of labels is sent thereto;
a second executable portion configured to receive a passcode formulated based upon the elements identified by the received set of labels; and
a third executable portion configured to authenticate the client based upon the formulated passcode.

26. A computer program product according to claim 25, wherein the first, second and third executable portions are configured to send a set of labels, receive a passcode and authenticate the client, respectively, a plurality of times, and wherein each set of labels sent by the first executable portion differs from each set of labels previously sent by the first executable portion.

27. A computer program product according to claim 25, wherein the computer-readable program code portions further comprise:
a fourth executable portion configured to generate a passcode based upon elements selected from the authentication matrix,
wherein the first executable portion is configured to send a set of labels identifying the selected elements, and
wherein the third executable portion is configured to authenticate the client further based upon the generated passcode.

28. A computer program product according to claim 27, wherein the computer-readable program code portions further comprise:
a fifth executable portion configured to provide an authentication matrix to an authenticator, and provide an authentication matrix to the client,
wherein the fourth executable portion is configured to generate a passcode based upon elements selected from the authentication matrix provided to the authenticator, and
wherein the second executable portion is configured to receive a passcode formulated based upon elements of the authentication matrix provided to the client corresponding to the elements selected from the authentication matrix provided to the authenticator.

29. A computer program product according to claim 28, wherein the fifth executable portion is configured to provide a plurality of authentication matrices to the authenticator, each authentication matrix associated with a different client, wherein the fifth executable portion is also configured to provide, to the client being authenticated, an authentication matrix associated with the respective client, and
wherein the fourth executable portion is configured to generate a passcode based upon elements selected from the authentication matrix provided to the authenticator and associated with the respective client.

30. A computer program product according to claim 29, wherein the computer-readable program code portions further comprise:
a sixth executable portion configured to receive at least one piece of identifying information associated with the client being authenticated; and
a seventh executable portion configured to identify, from the plurality of authentication matrices, the authentication matrix associated with the client being authenticated based upon the at least one piece of identifying information,
wherein the fourth executable portion is configured to generate a passcode based upon elements selected from the identified authentication matrix.

31. A computer program product according to claim 27, wherein the fourth executable portion is configured to generate a passcode further based upon a personal identification number (PIN) associated with the client, and wherein the second executable portion is configured to receive a passcode formulated further based upon the PIN.

32. A computer program product according to claim 31, wherein the fourth executable portion is adapted to generate a passcode including elements selected from the authentication matrix and the PIN in a variable position with respect to the selected elements, wherein the second executable portion is configured to receive a passcode formulated to include the identified elements and the PIN in the variable position with respect to the identified elements, and wherein the third executable portion is configured to authenticate the client by identifying a match between the generated passcode and the formulated passcode.

33. An apparatus comprising:
- a processor configured to send, to a client, a set of a plurality of labels identifying a respective plurality of elements of a matrix, the matrix including a plurality of elements organized in one or more columns and rows each of which includes a respective non-time based header, each element being identifiable by a label including a column header and a row header that identifies the respective column and row of the element, the set of labels including the column headers and row headers of the respective labels being unknown at the client until the set of labels is sent thereto, and wherein the processor is configured to receive a response from the client formulated based upon the elements identified by the received set of labels.

34. An apparatus according to claim 33, wherein the processor is configured to send a set of labels, and receive a formulated response a plurality of times, and wherein the processor is configured to send each set of labels such that the sent set of labels differs from each previously sent set of labels.

35. An apparatus according to claim 33, wherein the matrix comprises an authentication matrix, wherein the processor is configured to receive a response comprising a formulated passcode, and wherein the processor is configured to authenticate the client based upon the formulated passcode.

36. An apparatus according to claim 35, wherein the processor is configured to generate a passcode based upon elements selected from the authentication matrix, wherein the processor is configured to send a set of labels identifying the selected elements, and wherein the processor is configured to authenticate the client further based upon the generated passcode.

37. An apparatus according to claim 36, wherein the processor is capable of providing, to the client, an authentication matrix stored in a database, wherein the processor is configured to generate a passcode based upon elements selected from the authentication matrix stored in the database, and wherein the processor is configured to receive a passcode formulated based upon elements of the authentication matrix provided to the client corresponding to the elements selected from the authentication matrix stored in the database.

38. An apparatus according to claim 37, wherein the database is configured to store a plurality of authentication matrices, each authentication matrix associated with a different client, wherein the processor is configured to provide, to the client being authenticated, an authentication matrix associated with the respective client, and wherein the processor is configured to generate a passcode based upon elements selected from the authentication matrix stored in the database and associated with the respective client.

39. An apparatus according to claim 38, wherein the processor is configured to receive at least one piece of identifying information associated with the client being authenticated, and thereafter identify, from the plurality of authentication matrices stored in the database, the authentication matrix associated with the client being authenticated based upon the at least one piece of identifying information, and wherein the processor is configured to generate a passcode based upon elements selected from the identified authentication matrix.

40. An apparatus according to claim 36, wherein the processor is configured to generate a passcode further based upon a personal identification number (PIN) associated with the client, and wherein the processor is configured to receive a passcode formulated further based upon the PIN.

41. An apparatus according to claim 40, wherein the processor is configured to generate a passcode including elements selected from the authentication matrix and the PIN in a variable position with respect to the selected elements, wherein the processor is configured to receive a passcode formulated to include the identified elements and the PIN in the variable position with respect to the identified elements, and wherein the processor is configured to authenticate the client by identifying a match between the generated passcode and the formulated passcode.

42. An apparatus comprising:
- a processor configured to receive a set of a plurality of labels identifying a respective plurality of elements of a matrix, the matrix including a plurality of elements organized in one or more columns and rows each of which includes a respective non-time based header, each element being identifiable by a label including a column header and a row header that identifies the respective column and row of the element, the set of labels including the column headers and row headers of the respective labels being unknown at the apparatus until the set of labels is received by the processor, wherein the client is configured to formulate or receive a formulated response based upon the elements identified by the received set of labels.

43. An apparatus according to claim 42, wherein the processor is configured to receive the set of labels and formulating a response a plurality of times, and wherein each set of labels received by the processor differs from each set of labels previously received by the processor.

44. An apparatus according to claim 42, wherein the processor is configured to receive the set of labels identifying elements of an authentication matrix, and wherein the processor is configured to formulate or receive a formulated response comprising a passcode to thereby enable authentication of the apparatus or a user of the apparatus based upon the formulated passcode.

45. An apparatus according to claim 42, wherein the processor is configured to receive a set of labels identifying elements selected from the authentication matrix during generation of a passcode, and wherein the processor is configured to formulate or receive the formulated passcode to thereby enable authentication of the apparatus or user further based upon the generated passcode.

46. An apparatus according to claim 45, wherein an authentication matrix is configured for provision to the apparatus or user from an authenticator configured to store an authentication matrix, wherein the processor is configured to receive a set of labels identifying elements selected from the authentication matrix stored by the authenticator, and wherein the processor is configured to formulate or receive a formulated passcode based upon elements of the authentication matrix provided to the apparatus or user corresponding to the elements selected from the authentication matrix stored by the authenticator.

47. An apparatus according to claim 46, wherein the authentication matrix configured for provision to the apparatus or user is associated with the respective apparatus or user, the respective authentication matrix being configured for provision from an authenticator configured to store a plurality of authentication matrices, each authentication matrix associated with a different apparatus or user, and wherein the processor is configured to receive a set of labels identifying elements selected from the authentication matrix stored by the authenticator and associated with the respective apparatus or user.

48. An apparatus according to claim 47, wherein the processor is configured to send the authenticator at least one piece of identifying information associated with the respective apparatus or user to thereby enable the authenticator to identify, from the plurality of authentication matrices, the authentication matrix associated with the respective apparatus or user based upon the at least one piece of identifying information, and wherein the processor is configured to receive a set of labels identifying elements selected from the identified authentication matrix.

49. An apparatus according to claim 45, wherein the processor is configured to receive a set of labels identifying elements selected from the authentication matrix during generation of a passcode based upon a personal identification number (PIN) associated with the apparatus or user, and wherein the processor is configured to formulate or receive a formulated passcode further based upon the PIN.

50. An apparatus according to claim 49, wherein the processor is configured to receive a set of labels identifying elements selected from the authentication matrix during generation of a passcode including elements selected from the authentication matrix and the PIN in a variable position with respect to the selected elements, wherein the processor is configured to formulate or receive a formulated passcode including the identified elements and the PIN in the variable position with respect to the identified elements to thereby enable authentication of the apparatus or user by identifying a match between the generated passcode and the formulated passcode.

51. A method comprising:
sending, to a client, a set of a plurality of labels identifying a respective plurality of elements of a matrix, the matrix including a plurality of elements organized in one or more columns and rows each of which includes a respective non-time based header, each element being identifiable by a label including a column header and row header that identifies the respective column and row of the element, the set of labels including the column headers and row headers of the respective labels being unknown at the client until the set of labels is sent thereto; and
receiving a response formulated based upon the elements identified by the received set of labels.

52. A method according to claim 51, wherein sending a set of labels and receiving a response occur a plurality of times, and wherein each received set of labels differs from each previously received set of labels.

53. A method according to claim 51, wherein sending a set of labels comprises sending a set of labels identifying elements of an authentication matrix, wherein receiving a response comprises receiving a formulated passcode, and wherein the method further comprises:
authenticating the client based upon the formulated passcode.

54. A method according to claim 53 further comprising:
generating a passcode based upon elements selected from the authentication matrix,
wherein sending a set of labels comprises receiving a set of labels identifying the selected elements, and
wherein authenticating the client comprises authenticating the client further based upon the generated passcode.

55. A method according to claim 54 further comprising:
providing an authentication matrix to an authenticator, and providing an authentication matrix to the client,
wherein generating a passcode comprises generating a passcode based upon elements selected from the authentication matrix provided to the authenticator, and
wherein receiving a passcode comprises receiving a passcode formulated based upon elements of the authentication matrix provided to the client corresponding to the elements selected from the authentication matrix provided to the authenticator.

56. A method according to claim 55, wherein providing an authentication matrix to an authenticator comprises providing a plurality of authentication matrices to an authenticator, each authentication matrix associated with a different client, wherein providing an authentication matrix to the client comprises providing, to the client being authenticated, an authentication matrix associated with the respective client, and
wherein generating a passcode comprises generating a passcode based upon elements selected from the authentication matrix provided to the authenticator and associated with the respective client.

57. A method according to claim 56 further comprising:
receiving at least one piece of identifying information associated with the client being authenticated; and
identifying, from the plurality of authentication matrices, the authentication matrix associated with the client being authenticated based upon the at least one piece of identifying information,
wherein generating a passcode comprises generating a passcode based upon elements selected from the identified authentication matrix.

58. A method according to claim 54, wherein generating a passcode comprises generating a passcode further based upon a personal identification number (PIN) associated with the client, and wherein receiving a passcode comprises receiving a passcode formulated further based upon the PIN.

59. A method according to claim 58, wherein generating a passcode comprises generating a passcode including elements selected from the authentication matrix and the PIN in a variable position with respect to the selected elements, wherein receiving a passcode comprises receiving a passcode formulated to include the identified elements and the PIN in the variable position with respect to the identified elements, and wherein authenticating the client comprises identifying a match between the generated passcode and the formulated passcode.

60. An apparatus according to claim 1, wherein the processor is configured to send a set of labels to the client in response to the client effectuating logging in, logging in including prompting the client for at least one piece of identifying information, and receiving the at least one piece of identifying information from the client, the at least one piece of identifying information comprising a user name and a password associated with a client user.

61. An apparatus according to claim 6, wherein the at least one piece of identifying information received by the processor is capable of identifying the client to an organization independent of the authentication matrix associated with the client.

62. An apparatus according to claim 9, wherein the processor is configured to receive a set of labels in response to the apparatus or user effectuating logging in, logging in including the apparatus or user being prompted for at least one piece of identifying information, and sending the at least one piece of identifying information, the at least one piece of identifying information comprising a user name and a password associated with the user.

63. An apparatus according to claim 14, wherein the at least one piece of identifying information sent by the processor is capable of identifying the apparatus or user to an organization independent of the authentication matrix associated with the respective apparatus or user.

64. A method according to claim 17, wherein sending a set of labels comprises sending a set of labels in response to effectuating logging in, logging in including prompting the client for at least one piece of identifying information, and receiving the at least one piece of identifying information, the at least one piece of identifying information comprising a user name and a password associated with a client user.

65. A method according to claim 22, wherein receiving at least one piece of identifying information comprises receiving at least one piece of identifying information capable of identifying the client to an organization independent of the authentication matrix associated with the client.

66. A computer program product according to claim 25, wherein the first executable portion is configured to send a set of labels in response to effectuating logging in, logging in including prompting the client for at least one piece of identifying information, and receiving the at least one piece of identifying information, the at least one piece of identifying information comprising a user name and a password associated with a client user.

67. A computer program product according to claim 30, wherein the at least one piece of identifying information received by the sixth executable portion is capable of identifying the client to an organization independent of the authentication matrix associated with the client.

68. An apparatus according to claim 33, wherein the processor is configured to send a set of labels to the client in response to effectuating logging in, logging in including prompting the client for at least one piece of identifying information, and receiving the at least one piece of identifying information, the at least one piece of identifying information comprising a user name and a password associated with a client user.

69. An apparatus according to claim 39, wherein the at least one piece of identifying information received by the processor is capable of identifying the client to an organization independent of the authentication matrix associated with the client.

70. An apparatus according to claim 42, wherein the processor is configured to receive a set of labels in response to effectuating logging in, logging in including the apparatus or user being prompted for at least one piece of identifying information, and sending the at least one piece of identifying information, the at least one piece of identifying information comprising a user name and a password associated with the user.

71. An apparatus according to claim 48, wherein the at least one piece of identifying information sent by the processor is capable of identifying the apparatus or user to an organization independent of the authentication matrix associated with the respective apparatus or user.

72. A method according to claim 51, wherein sending a set of labels comprises sending a set of labels in response to effectuating logging in, logging in including prompting the client for at least one piece of identifying information, and receiving the at least one piece of identifying information, the at least one piece of identifying information comprising a user name and a password associated with a client user.

73. A method according to claim 57, wherein receiving at least one piece of identifying information comprises receiving at least one piece of identifying information capable of identifying the client to an organization independent of the authentication matrix associated with the client.

74. An apparatus comprising:
a processor configured to prompt a user for at least one piece of identifying information associated with the user, the user being prompted during effectuation of logging in,
wherein the processor is configured to receive the identifying information in response to prompting the user, wherein the processor receiving of the identifying information invokes an authentication procedure, the authentication procedure comprising:
selecting a set of labels identifying respective elements of an authentication matrix, wherein the authentication matrix includes a plurality of elements organized in one or more columns and rows each of which includes a respective non-time based header, each element being identifiable by a label including a column header and row header that identifies the respective column and row of the element;
providing the selected set of labels to the user, the set of selected labels including the column headers and row headers of the respective labels being unknown to the user until the set is provided;
receiving a passcode from the user in response to providing the set of labels, the passcode having been formulated based upon the elements identified by the provided set of labels; and
authenticating the user based upon the received passcode.

75. An apparatus according to claim 74, wherein the processor is configured to prompt the user and receive the identifying information for each of a plurality of instances of logging in, and wherein the processor receiving of the identifying information for each instance invokes the authentication procedure such that the set of labels provided for the respective instance differs between the set of labels provided for each previous instance.

76. An apparatus according to claim 75, wherein the processor receiving of the identifying information for each instance invokes the authentication procedure such that the received passcode is unique to the respective instance.

77. An apparatus according to claim 74, wherein the processor is configured to receive at least one piece of identifying information such that the authentication procedure further comprises:
identifying, from the plurality of authentication matrices, the authentication matrix associated with the client being authenticated based upon the at least one piece of identifying information, the selected set of labels identifying elements of the identified authentication matrix.

78. An apparatus according to claim 77, wherein the at least one piece of identifying information received by the processor is capable of identifying the client to an organization independent of the authentication matrix associated with the client.

79. An apparatus according to claim 74, wherein the processor is configured to receive at least one piece of identifying information such that the authentication procedure includes receiving a passcode having been formulated further based upon a personal identification number (PIN) associated with the client.

80. An apparatus according to claim 79, wherein the processor is configured to receive at least one piece of identifying information such that the authentication procedure includes receiving a passcode having been formulated including at least one element selected from the authentication matrix and the PIN in a predefined position with respect to the selected at least one element.

81. An apparatus according to claim 74, wherein the identifying information received by the processor comprises a user name and a password associated with the user.

82. A method for authenticating a user comprising:
prompting a user for at least one piece of identifying information associated with the user, the user being prompted during effectuation of logging in; and
receiving the identifying information in response to prompting the user, wherein receiving of the identifying information invokes an authentication procedure, the authentication procedure comprising:
selecting a set of labels identifying respective elements of an authentication matrix, wherein the authentication matrix includes a plurality of elements organized in one or more columns and rows each of which includes a respective non-time based header, each element being identifiable by a label including a column header and row header that identifies the respective column and row of the element;
providing the selected set of labels to the user, the set of selected labels including the column headers and row headers of the respective labels being unknown to the user until the set is provided;
receiving a passcode from the user in response to providing the set of labels, the passcode having been formulated based upon the elements identified by the provided set of labels; and
authenticating the user based upon the received passcode.

83. A method according to claim 82, wherein prompting the user and receiving the identifying information occur for each of a plurality of instances of logging in, and wherein the receiving of the identifying information for each instance invokes the authentication procedure such that the set of labels provided for the respective instance differs between the set of labels provided for each previous instance.

84. A method according to claim 83, wherein the receiving of the identifying information for each instance invokes the authentication procedure such that the received passcode is unique to the respective instance.

85. A method according to claim 82, wherein receiving at least one piece of identifying information comprises receiving at least one piece of identifying information such that the authentication procedure further comprises:
identifying, from the plurality of authentication matrices, the authentication matrix associated with the client being authenticated based upon the at least one piece of identifying information, the selected set of labels identifying elements of the identified authentication matrix.

86. A method according to claim 85, wherein the received at least one piece of identifying information is capable of identifying the client to an organization independent of the authentication matrix associated with the client.

87. A method according to claim 82, wherein receiving at least one piece of identifying information comprises receiving at least one piece of identifying information such that the authentication procedure includes receiving a passcode having been formulated further based upon a personal identification number (PIN) associated with the client.

88. A method according to claim 87, wherein receiving at least one piece of identifying information comprises receiving at least one piece of identifying information such that the authentication procedure includes receiving a passcode having been formulated including at least one element selected from the authentication matrix and the PIN in a predefined position with respect to the selected at least one element.

89. A method according to claim 82, wherein prompting a user comprises prompting a user for identifying information comprising a user name and a password associated with the user.

90. A computer program product for authenticating a user, the computer program product comprising at least one non-transitory computer-readable storage medium having computer-readable program code portions stored therein, the computer-readable program code portions comprising:
a first executable portion configured to prompt a user for at least one piece of identifying information associated with the user, the user being prompted during effectuation of logging in; and
a second executable portion configured to receive the identifying information in response to prompting the user, wherein the second executable portion receiving of the identifying information invokes an authentication procedure, the authentication procedure comprising:
selecting a set of labels identifying respective elements of an authentication matrix, wherein the authentication matrix includes a plurality of elements organized in one or more columns and rows each of which includes a respective non-time based header, each element being identifiable by a label including a column header and row header that identifies the respective column and row of the element;
providing the selected set of labels to the user, the set of selected labels including the column headers and row headers of the respective labels being unknown to the user until the set is provided;
receiving a passcode from the user in response to providing the set of labels, the passcode having been formulated based upon the elements identified by the provided set of labels; and
authenticating the user based upon the received passcode.

91. A computer program product according to claim 90, wherein the first and second executable portions are configured to prompt the user and receive the identifying information for each of a plurality of instances of logging in, and wherein the second executable portion receiving of the identifying information for each instance invokes the authentication procedure such that the set of labels provided for the respective instance differs between the set of labels provided for each previous instance.

92. A computer program product according to claim 91, wherein the second executable portion receiving of the identifying information for each instance invokes the authentication procedure such that the received passcode is unique to the respective instance.

93. A computer program product according to claim 90, wherein the second executable portion is configured to receive at least one piece of identifying information such that the authentication procedure further comprises:
identifying, from the plurality of authentication matrices, the authentication matrix associated with the client being authenticated based upon the at least one piece of identifying information, the selected set of labels identifying elements of the identified authentication matrix.

94. A computer program product according to claim 93, wherein the at least one piece of identifying information received by the second executable portion is capable of identifying the client to an organization independent of the authentication matrix associated with the client.

95. A computer program product according to claim 90, wherein the second executable portion is configured to receive at least one piece of identifying information such that the authentication procedure includes receiving a passcode having been formulated further based upon a personal identification number (PIN) associated with the client.

96. A computer program product according to claim 95, wherein the second executable portion is configured to receive at least one piece of identifying information such that the authentication procedure includes receiving a passcode having been formulated including at least one element selected from the authentication matrix and the PIN in a predefined position with respect to the selected at least one element.

97. A computer program product according to claim 90, wherein the first executable portion is configured to prompt a user for identifying information comprising a user name and a password associated with the user.

* * * * *